(12) United States Patent
Luo et al.

(10) Patent No.: US 9,906,966 B2
(45) Date of Patent: *Feb. 27, 2018

(54) NETWORK OPTIMIZATION SYSTEM, DEVICE, AND METHOD

(71) Applicant: Huawei Technologies Co., Ltd., Shenzhen (CN)

(72) Inventors: Zezhou Luo, Shenzhen (CN); Hongcheng Zhuang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/646,727

(22) Filed: Jul. 11, 2017

(65) Prior Publication Data

US 2017/0311184 A1    Oct. 26, 2017

Related U.S. Application Data

(63) Continuation of application No. 15/187,441, filed on Jun. 20, 2016, now Pat. No. 9,723,500, which is a
(Continued)

(51) Int. Cl.
*H04B 17/00* (2015.01)
*H04W 24/02* (2009.01)
(Continued)

(52) U.S. Cl.
CPC .......... *H04W 24/02* (2013.01); *H04W 28/06* (2013.01); *H04W 72/0446* (2013.01)

(58) Field of Classification Search
CPC .. H04W 24/02; H04W 28/06; H04W 72/0446
See application file for complete search history.

(56) References Cited

U.S. PATENT DOCUMENTS

2012/0135696 A1*  5/2012  Lerzer .............. H04W 52/0296
                                                                455/127.1
2012/0238263 A1*  9/2012  Caretti ................. H04W 16/10
                                                                455/426.1
(Continued)

FOREIGN PATENT DOCUMENTS

CN          102612058 A       7/2012
CN          103298040 A       9/2013
(Continued)

OTHER PUBLICATIONS

U.S. Appl. No. 15/187,441, filed Jun. 20, 2016.
U.S. Appl. No. 15/636,283, filed Jun. 28, 2017.

*Primary Examiner* — Tuan Pham
(74) *Attorney, Agent, or Firm* — Leydig, Voit & Mayer, Ltd.

(57) ABSTRACT

The present invention provides a network optimization system, device, and method, including: determining, by a radio resource management functional entity, radio resource statistical data that is based on a TTI time granularity, acquiring radio resource configuration information, and managing a radio resource of a cell in which the radio resource management functional entity is located; determining, by a distributed optimization functional entity, first time granularity data and a first key performance index (KPI), determining first reference configuration information, determining a first optimization plan according to the first statistical data and the first reference configuration information, and optimizing the first KPI; and determining, by a centralized optimization functional entity, second statistical data that is based on a second time granularity, and a second KPI, determining second reference configuration information, determining, according to the second statistical data and the second reference configuration information.

2 Claims, 6 Drawing Sheets

Related U.S. Application Data continuation of application No. PCT/CN2013/090128, filed on Dec. 20, 2013.

(51) Int. Cl.
*H04W 28/06* (2009.01)
*H04W 72/04* (2009.01)

(56) References Cited

U.S. PATENT DOCUMENTS

| | | | |
|---|---|---|---|
| 2013/0053078 A1* | 2/2013 | Barbieri | H04B 7/024 455/509 |
| 2013/0223403 A1 | 8/2013 | Chen et al. | |
| 2015/0057005 A1 | 2/2015 | Sun et al. | |

FOREIGN PATENT DOCUMENTS

| | | |
|---|---|---|
| CN | 103384372 A | 11/2013 |
| WO | 2013148048 A1 | 10/2013 |

\* cited by examiner

A radio resource management functional entity determines radio resource statistical data that is based on a TTI time granularity, sends the radio resource statistical data to a distributed optimization functional entity, receives a first optimization plan sent by the distributed optimization functional entity and a second optimization plan sent by a centralized optimization functional entity, determines radio resource configuration information according to the first optimization plan and the second optimization plan, and manages, according to the radio resource statistical data and the radio resource configuration information, a radio resource of a cell in which the radio resource management functional entity is located ~ 801

The distributed optimization functional entity receives the radio resource statistical data sent by the radio resource management functional entity, determines, according to the radio resource statistical data, first statistical data that is based on a first time granularity, acquires characteristic information of the radio resource management functional entity, determines first reference configuration information and a first KPI according to the characteristic information of the radio resource management functional entity, determines association statistical data that is based on the first time granularity and that is associated with a second KPI, determines, according to first time granularity data and the first reference configuration information, a first optimization plan that corresponds to the first KPI, and optimizes the first KPI according to the first optimization plan, where the first time granularity data includes the first statistical data and the association statistical data; and sends the first time granularity data to the centralized optimization functional entity ~ 802

The centralized optimization functional entity receives the first time granularity data sent by the distributed optimization functional entity, where the first time granularity data includes the first statistical data and the association statistical data; determines, according to the first time granularity data, second statistical data that is based on a second time granularity, determines, according to the second statistical data, the second optimization plan that corresponds to the second KPI, and optimizes the second KPI according to the second optimization plan ~ 803

FIG. 8

NETWORK OPTIMIZATION SYSTEM, DEVICE, AND METHOD

CROSS-REFERENCE TO RELATED APPLICATIONS

This application is a continuation of U.S. application Ser. No. 15/187,441, filed on Jun. 20, 2016, which is a continuation of International Application No. PCT/CN2013/090128, filed on Dec. 20, 2013. All of the afore-mentioned patent applications are hereby incorporated by reference in their entireties.

TECHNICAL FIELD

Embodiments of the present invention relate to the field of communications technologies, and more specifically, to a network optimization system, device, and method.

BACKGROUND

With the rapid growth of a network scale and user requirements, using air interface transmission technologies and network management optimization technologies to improve performance and efficiency of a wireless network has become a key to successful operation of a wireless network. At present, advanced air interface transmission technologies such as the OFDMA, multi-antenna transmission, and various channel coding and decoding technologies have made single link performance very close to a Shannon limit, and system-level network optimization technologies will be a key to improving network performance. On the other hand, to improve network efficiency, a network configuration needs to adapt to a network environment change. Therefore, during network optimization, it is required to know the network environment change. Network environment changes at different time granularities may be perceived by using different sampling frequency, and therefore a change rule can be discovered and proper network optimization technologies and algorithms are used.

Existing network optimization methods can be classified into a centralized optimization method and a distributed optimization method. An optimization decision of the centralized network optimization method is made at a centralized control point. The centralized control point is connected to all cells to collect measurement values of all the cells, determines an optimization plan according to the measurement values of all the cells, and updates corresponding configurations of all the cells; therefore, performance of an entire network can be improved. An optimization decision of the distributed network optimization method is made in each cell. Each cell determines, according to a detection value of the cell, an optimization plan used for optimizing the cell, and updates a corresponding configuration of the cell; therefore, performance of an entire network can be improved. If the centralized optimization method is used, sending, by all cells in the network, measurement values to the centralized control point generates great overheads. Therefore, the centralized optimization method usually takes into consideration a change at a large time granularity, and an optimization effect is reflected in a network performance index of a large time granularity. In contrast, an advantage of the distributed optimization method is that a change at a small time granularity may be taken into consideration, and an optimization effect is reflected in a network performance index of a small time granularity.

In an existing network, optimization of some key performance indexes (Key Performance Index, KPI) affects some other KPIs. Therefore, how to jointly optimize KPIs is a problem urgently needing to be resolved. However, the distributed optimization method usually takes into consideration only on a KPI of a small time granularity, and the centralized optimization method usually takes into consideration only on a KPI of a large time granularity; therefore, the KPI of a large time granularity and the KPI of a small time granularity cannot be optimized jointly.

SUMMARY

Embodiments of the present invention disclose a network optimization system, device, and method, which can perform joint optimization on a device in a system based on two different time granularities.

According to a first aspect, an embodiment of the present invention provides a network optimization system, where the system includes a radio resource management functional entity, a distributed optimization functional entity, and a centralized optimization functional entity, where the radio resource management functional entity is configured to determine radio resource statistical data that is based on a transmission time interval TTI time granularity, and send the radio resource statistical data to the distributed optimization functional entity; the distributed optimization functional entity is configured to receive the radio resource statistical data sent by the radio resource management functional entity, determine, according to the radio resource statistical data, first statistical data that is based on a first time granularity, acquire characteristic information of the radio resource management functional entity, determine first reference configuration information and a first key performance index KPI according to the characteristic information of the radio resource management functional entity, determine association statistical data that is based on the first time granularity and that is associated with a second KPI, determine, according to first time granularity data and the first reference configuration information, a first optimization plan that corresponds to the first KPI, optimize the first KPI according to the first optimization plan, and send the first time granularity data to the centralized optimization functional entity, where the first time granularity data includes the first statistical data and the association statistical data; and the centralized optimization functional entity is configured to receive the first time granularity data sent by the distributed optimization functional entity, determine, according to the first time granularity data, second statistical data that is based on a second time granularity, determine, according to the second statistical data, a second optimization plan that corresponds to the second KPI, and optimize the second KPI according to the second optimization plan, where the second time granularity is greater than the first time granularity.

With reference to the first aspect, in a first possible implementation manner, the distributed optimization functional entity is further configured to send the first optimization plan to the centralized optimization functional entity; and the centralized optimization functional entity is further configured to determine, according to the first optimization plan and the second statistical data, the second optimization plan that corresponds to the second KPI, and optimize the second KPI according to the second optimization plan.

With reference to the first aspect or the first possible implementation manner, in a second possible implementation manner, the radio resource management functional entity is further configured to receive the first optimization plan sent by the distributed optimization functional entity and the second optimization plan sent by the centralized optimization functional entity; and the radio resource management functional entity is specifically configured to determine the radio resource configuration information according to the first optimization plan and the second optimization plan.

With reference to the first aspect or either of the foregoing possible implementation manners, in a third possible implementation manner, the distributed optimization functional entity is further configured to receive the second optimization plan sent by the centralized optimization functional entity; and the distributed optimization functional entity is further configured to determine the first reference configuration information according to the characteristic information of the radio resource management functional entity and the second optimization plan.

With reference to the first aspect or any one of the foregoing possible implementation manners, in a fourth possible implementation manner, the radio resource statistical data includes a current service request quantity and a resource block that is already allocated; the first statistical data includes a service request quantity that is based on the first time granularity and an average quantity, based on the first time granularity, of resource blocks in each sub-band that are already allocated; the characteristic information is about user scheduling; the first reference configuration information is sub-band division information; the first KPI is a throughput; the association statistical data includes interference environment measurement information; the first optimization plan is a power limit of each sub-band; the second statistical data includes a service request quantity that is based on the second time granularity and an average quantity, based on the second time granularity, of resource blocks in each sub-band that are already allocated; the second KPI is load; and the second optimization plan is to divide a sub-band.

With reference to the first aspect or any possible implementation manner of the first possible implementation manner to the third possible implementation manner, in a fifth possible implementation manner, the radio resource statistical data includes user distribution information and a current service request quantity; the first statistical data includes a service request quantity that is based on the first time granularity and user distribution information that is based on the first time granularity; the characteristic information is about user scheduling; the first reference configuration information is a user association relationship and an antenna downtilt; the first KPI is a cell-edge user throughput; the association statistical data includes load statistical information; the first optimization plan is a configuration parameter of the radio resource management functional entity and a cell transmit power limit; the second statistical data includes a service request quantity that is based on the second time granularity and user distribution information that is based on the second time granularity; the second KPI is a coverage; and the second optimization plan is to adjust an antenna downtilt and an optimization association relationship.

With reference to the first aspect or any one of the foregoing possible implementation manners, in a sixth possible implementation manner, the radio resource configuration information is a channel state at a current TTI.

According to a second aspect, an embodiment of the present invention provides a radio resource management functional entity, where the radio resource management functional entity includes: a processor, configured to determine radio resource statistical data that is based on a transmission time interval TTI time granularity; a transmitter, configured to send the radio resource statistical data to a distributed optimization functional entity; and a receiver, configured to receive a first optimization plan sent by the distributed optimization functional entity and a second optimization plan sent by a centralized optimization functional entity, where the first optimization plan is determined by the distributed optimization functional entity according to first time granularity data and first reference configuration information, the second optimization plan is determined by the centralized optimization functional entity according to second statistical data that is based on a second time granularity, and the second time granularity is greater than a first time granularity, where the processor is further configured to determine radio resource configuration information according to the first optimization plan and the second optimization plan; and the processor is further configured to manage, according to the radio resource statistical data and the radio resource configuration information, a radio resource of a cell in which the radio resource management functional entity is located.

With reference to the second aspect, in a first possible implementation manner, the radio resource statistical data includes a current service request quantity and a resource block that is already allocated; the first time granularity data includes first statistical data and association statistical data; the first statistical data includes a service request quantity that is based on the first time granularity and an average quantity, based on the first time granularity, of resource blocks in each sub-band that are already allocated; the association statistical data includes interference environment measurement information; the first reference configuration information is sub-band division information; the first optimization plan is a power limit of each sub-band; the second statistical data includes a service request quantity that is based on the second time granularity and an average quantity, based on the second time granularity, of resource blocks in each sub-band that are already allocated; and the second optimization plan is to divide a sub-band.

With reference to the second aspect, in a second possible implementation manner, the radio resource statistical data includes user distribution information and a current service request quantity; the first time granularity data includes first statistical data and association statistical data; the first statistical data includes a service request quantity that is based on the first time granularity and user distribution information that is based on the first time granularity; the first reference configuration information is a user association relationship and an antenna downtilt; the association statistical data includes load statistical information; the first optimization plan is a configuration parameter of the radio resource management functional entity and a cell transmit power limit; the second statistical data includes a service request quantity that is based on the second time granularity and user distribution information that is based on the second time granularity; and the second optimization plan is to adjust an antenna downtilt and an optimization association relationship.

With reference to the second aspect or either of the foregoing possible implementation manners, in a third possible implementation manner, the radio resource configuration information is a channel state at a current TTI.

According to a third aspect, an embodiment of the present invention provides a distributed optimization functional entity, where the distributed optimization functional entity includes: a receiver, configured to receive radio resource statistical data sent by a radio resource management functional entity; a processor, configured to determine, according to the radio resource statistical data, first statistical data that is based on a first time granularity, where the processor is further configured to acquire characteristic information of the radio resource management functional entity, and determine first reference configuration information and a first key performance index KPI according to the characteristic information of the radio resource management functional entity; the processor is further configured to determine association statistical data that is based on the first time granularity and that is associated with a second KPI; and the processor is further configured to determine, according to first time granularity data and the first reference configuration information, a first optimization plan that corresponds to the first KPI, and optimize the first KPI according to the first optimization plan, where the first time granularity data includes the first statistical data and the association statistical data; and a transmitter, configured to send the first time granularity data to a centralized optimization functional entity, so that the centralized optimization functional entity determines second statistical data that is based on a second time granularity, and a second optimization plan, where the second time granularity is greater than the first time granularity.

With reference to the third aspect, in a first possible implementation manner, the transmitter is further configured to send the first optimization plan to the centralized optimization functional entity, so that the centralized optimization functional entity determines the second statistical data and the second optimization plan.

With reference to the third aspect or the first possible implementation manner, in a second possible implementation manner, the receiver is further configured to receive the second optimization plan sent by the centralized optimization functional entity; and the processor is specifically configured to determine the first reference configuration information according to the characteristic information of the radio resource management functional entity and the second optimization plan.

With reference to the third aspect or either of the foregoing possible implementation manners, in a third possible implementation manner, the transmitter is further configured to send the first optimization plan to the radio resource management functional entity, so that the radio resource management functional entity determines radio resource configuration information.

With reference to the third aspect or any one of the foregoing possible implementation manners, in a fourth possible implementation manner, the radio resource statistical data includes a current service request quantity and a resource block that is already allocated; the first statistical data includes a service request quantity that is based on the first time granularity and an average quantity, based on the first time granularity, of resource blocks in each sub-band that are already allocated; the characteristic information is about user scheduling; the first reference configuration information is sub-band division information; the first KPI is a throughput; the association statistical data includes interference environment measurement information; and the first optimization plan is a power limit of each sub-band.

With reference to the third aspect or any possible implementation manner of the first possible implementation manner to the third possible implementation manner, in a fifth possible implementation manner, the radio resource statistical data includes user distribution information and a current service request quantity; the first statistical data includes a service request quantity that is based on the first time granularity and user distribution information that is based on the first time granularity; the characteristic information is about user scheduling; the first reference configuration information is a user association relationship and an antenna downtilt; the first KPI is a cell-edge user throughput; the association statistical data includes load statistical information; and the first optimization plan is a configuration parameter of the radio resource management functional entity and a cell transmit power limit.

According to a fourth aspect, an embodiment of the present invention provides a centralized optimization functional entity, where the centralized optimization functional entity includes: a receiver, configured to receive first time granularity data sent by a distributed optimization functional entity, where the first time granularity data includes first statistical data and association statistical data; and a processor, configured to determine, according to the first time granularity data, second statistical data that is based on a second time granularity, determine, according to the second statistical data, a second optimization plan that corresponds to a second key performance index KPI, and optimize the second KPI according to the second optimization plan, where the second time granularity is greater than a first time granularity.

With reference to the fourth aspect, in a first possible implementation manner, the receiver is further configured to receive a first optimization plan sent by the distributed optimization functional entity; and the processor is configured to determine, according to the second statistical data and the first optimization plan, the second optimization plan that corresponds to the second KPI, and optimize the second KPI according to the second optimization plan.

With reference to the fourth aspect or the first possible implementation manner, in a second possible implementation manner, the centralized optimization functional entity further includes: a transmitter, configured to send the second optimization plan to a radio resource management functional entity, so that the radio resource management functional entity determines radio resource configuration information.

With reference to the fourth aspect or the first possible implementation manner, in a third possible implementation manner, the centralized optimization functional entity further includes: a transmitter, configured to send the second optimization plan to the distributed optimization functional entity, so that the distributed optimization functional entity determines first reference configuration information.

With reference to the fourth aspect or any one of the foregoing possible implementation manners, in a fourth possible implementation manner, the first statistical data includes a service request quantity that is based on the first time granularity and an average quantity, based on the first time granularity, of resource blocks in each sub-band that are already allocated; the association statistical data includes interference environment measurement information; the second statistical data includes a service request quantity that is based on the second time granularity and an average quantity, based on the second time granularity, of resource blocks in each sub-band that are already allocated; the second KPI is load; and the second optimization plan is to divide a sub-band.

With reference to the fourth aspect or any possible implementation manner of the first possible implementation manner to the third possible implementation manner, in a fifth possible implementation manner, the first statistical data includes a service request quantity that is based on the first time granularity and user distribution information that is based on the first time granularity; the association statistical data includes load statistical information; the second statistical data includes a service request quantity that is based on the second time granularity and user distribution information that is based on the second time granularity; the second KPI is a coverage; and the second optimization plan is to adjust an antenna downtilt and an optimization association relationship.

According to a fifth aspect, an embodiment of the present invention provides a network optimization method, where the method is executed by a radio resource management functional entity, and the method includes: determining radio resource statistical data that is based on a transmission time interval TTI time granularity; sending the radio resource statistical data to a distributed optimization functional entity; receiving a first optimization plan sent by the distributed optimization functional entity and a second optimization plan sent by a centralized optimization functional entity, where the first optimization plan is obtained according to first time granularity data, the second optimization plan is obtained according to second time granularity data, and a second time granularity is greater than a first time granularity; determining radio resource configuration information according to the first optimization plan and the second optimization plan; and managing, according to the radio resource statistical data and the radio resource configuration information, a radio resource of a cell in which the radio resource management functional entity is located.

With reference to the fifth aspect, in a first possible implementation manner, the radio resource statistical data includes a current service request quantity and a resource block that is already allocated; the first time granularity data includes first statistical data and association statistical data; the first statistical data includes a service request quantity that is based on the first time granularity and an average quantity, based on the first time granularity, of resource blocks in each sub-band that are already allocated; the association statistical data includes interference environment measurement information; the first reference configuration information is sub-band division information; the first optimization plan is a power limit of each sub-band; the second statistical data includes a service request quantity that is based on the second time granularity and an average quantity, based on the second time granularity, of resource blocks in each sub-band that are already allocated; and the second optimization plan is to divide a sub-band.

With reference to the fifth aspect, in a second possible implementation manner, the radio resource statistical data includes user distribution information and a current service request quantity; the first time granularity data includes first statistical data and association statistical data; the first statistical data includes a service request quantity that is based on the first time granularity and user distribution information that is based on the first time granularity; the first reference configuration information is a user association relationship and an antenna downtilt; the association statistical data includes load statistical information; the first optimization plan is a configuration parameter of the radio resource management functional entity and a cell transmit power limit; the second statistical data includes a service request quantity that is based on the second time granularity and user distribution information that is based on the second time granularity; and the second optimization plan is to adjust an antenna downtilt and an optimization association relationship.

With reference to the fifth aspect or either of the foregoing possible implementation manners, in a third possible implementation manner, the radio resource configuration information is a channel state at a current TTI.

According to a sixth aspect, an embodiment of the present invention provides a network optimization method, where the method is executed by a distributed optimization functional entity, and the method includes: receiving radio resource statistical data sent by a radio resource management functional entity; determining, according to the radio resource statistical data, first statistical data that is based on a first time granularity; acquiring characteristic information of the radio resource management functional entity, and determining first reference configuration information and a first key performance index KPI according to the characteristic information of the radio resource management functional entity; determining association statistical data that is based on the first time granularity and that is associated with a second KPI; determining, according to first time granularity data and the first reference configuration information, a first optimization plan that corresponds to the first KPI, and optimizing the first KPI according to the first optimization plan, where the first time granularity data includes the first statistical data and the association statistical data; and sending the first time granularity data to a centralized optimization functional entity, so that the centralized optimization functional entity determines second statistical data that is based on a second time granularity, and a second optimization plan, where the second time granularity is greater than the first time granularity.

With reference to the sixth aspect, in a first possible implementation manner, the method further includes: sending the first optimization plan to the centralized optimization functional entity, so that the centralized optimization functional entity determines the second statistical data and the second optimization plan.

With reference to the sixth aspect or the first possible implementation manner, in a second possible implementation manner, before the determining first reference configuration information according to the characteristic information of the radio resource management functional entity, the method further includes: receiving the second optimization plan sent by the centralized optimization functional entity; and the determining first reference configuration information according to the characteristic information of the radio resource management functional entity includes: determining the first reference configuration information according to the characteristic information of the radio resource management functional entity and the second optimization plan.

With reference to the sixth aspect or either of the foregoing possible implementation manners, in a third possible implementation manner, the method further includes: sending the first optimization plan to the radio resource management functional entity, so that the radio resource management functional entity determines radio resource configuration information.

With reference to the sixth aspect or any one of the foregoing possible implementation manners, in a fourth possible implementation manner, the radio resource statistical data includes a current service request quantity and a resource block that is already allocated; the first statistical data includes a service request quantity that is based on the first time granularity and an average quantity, based on the first time granularity, of resource blocks in each sub-band that are already allocated; the characteristic information is about user scheduling; the first reference configuration information is sub-band division information; the first KPI is a throughput; the association statistical data includes interference environment measurement information; and the first optimization plan is a power limit of each sub-band.

With reference to the sixth aspect or any possible implementation manner of the first possible implementation manner to the third possible implementation manner, in a fifth possible implementation manner, the radio resource statistical data includes user distribution information and a current service request quantity; the first statistical data includes a service request quantity that is based on the first time granularity and user distribution information that is based on the first time granularity; the characteristic information is about user scheduling; the first reference configuration information is a user association relationship and an antenna downtilt; the first KPI is a cell-edge user throughput; the association statistical data includes load statistical information; and the first optimization plan is a configuration parameter of the radio resource management functional entity and a cell transmit power limit.

According to a seventh aspect, an embodiment of the present invention provides a network optimization method, where the method is executed by a centralized optimization functional entity, and the method includes: receiving first time granularity data sent by a distributed optimization functional entity, where the first time granularity data includes first statistical data and association statistical data; determining, according to the first time granularity data, second statistical data that is based on a second time granularity; and determining, according to the second statistical data, a second optimization plan that corresponds to a second key performance index KPI, and optimizing the second KPI according to the second optimization plan.

With reference to the seventh aspect, in a first possible implementation manner, before the determining, according to the second statistical data, a second optimization plan that corresponds to a second key performance index KPI, the method further includes: receiving a first optimization plan sent by the distributed optimization functional entity; and the determining, according to the second statistical data, a second optimization plan that corresponds to a second key performance index KPI includes: determining, according to the second statistical data and the first optimization plan, the second optimization plan that corresponds to the second KPI.

With reference to the seventh aspect or the first possible implementation manner, in a second possible implementation manner, the method further includes: sending the second optimization plan to a radio resource management functional entity, so that the radio resource management functional entity determines radio resource configuration information.

With reference to the seventh aspect or either of the foregoing possible implementation manners, in an eighth possible implementation manner, the method further includes: sending the second optimization plan to the distributed optimization functional entity, so that the distributed optimization functional entity determines first reference configuration information.

With reference to the seventh aspect or any one of the foregoing possible implementation manners, in a fourth possible implementation manner, the first statistical data includes a service request quantity that is based on the first time granularity and an average quantity, based on the first time granularity, of resource blocks in each sub-band that are already allocated; the association statistical data includes interference environment measurement information; the second statistical data includes a service request quantity that is based on the second time granularity and an average quantity, based on the second time granularity, of resource blocks in each sub-band that are already allocated; the second KPI is load; and the second optimization plan is to divide a sub-band.

With reference to the seventh aspect or any possible implementation manner of the first possible implementation manner to the third possible implementation manner, in a fifth possible implementation manner, the first statistical data includes a service request quantity that is based on the first time granularity and user distribution information that is based on the first time granularity; the association statistical data includes load statistical information; the second statistical data includes a service request quantity that is based on the second time granularity and user distribution information that is based on the second time granularity; the second KPI is a coverage; and the second optimization plan is to adjust an antenna downtilt and an optimization association relationship.

According to the embodiments of the present invention, a distributed optimization functional entity can determine, according to related data of a radio resource management functional entity, an optimization plan that is based on a first time granularity, and a centralized optimization functional entity can determine, according to a first optimization plan of the distributed optimization functional entity and first time granularity data, an optimization plan that is based on a second time granularity, thereby implementing joint optimization based on two different time granularities.

BRIEF DESCRIPTION OF DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

FIG. 8 is a schematic diagram of a network optimization method according to an embodiment of the present invention.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

It should be understood that, the technical solutions of the embodiments of the present invention may be applied to various communications systems, such as a Global System for Mobile Communications ("GSM" for short), a Code Division Multiple Access ("CDMA" for short) system, a Wideband Code Division Multiple Access ("WCDMA" for short) system, a general packet radio service ("GPRS" for short), a Long Term Evolution ("LTE" for short) system, an LTE frequency division duplex ("FDD" for short) system, an LTE time division duplex ("TDD" for short), and a Universal Mobile Telecommunications System ("UMTS" for short).

User equipment (UE), also referred to as a mobile terminal (MT), mobile user equipment, and the like, may communicate with one or more core networks by using a radio access network (for example, Radio Access Network, RAN). The user equipment may be a mobile terminal, such as a mobile phone (which is also referred to as a "cellular" phone) and a computer with a mobile terminal. For example, the user equipment may be a portable, pocket-sized, handheld, computer built-in, or in-vehicle mobile apparatus.

A base station may be a base station (Base Transceiver Station, BTS) in GSM or CDMA, may be a base station (NodeB) in WCDMA, or may be an eNB or e-NodeB in LTE, which is not limited in the present invention.

Figure 1:
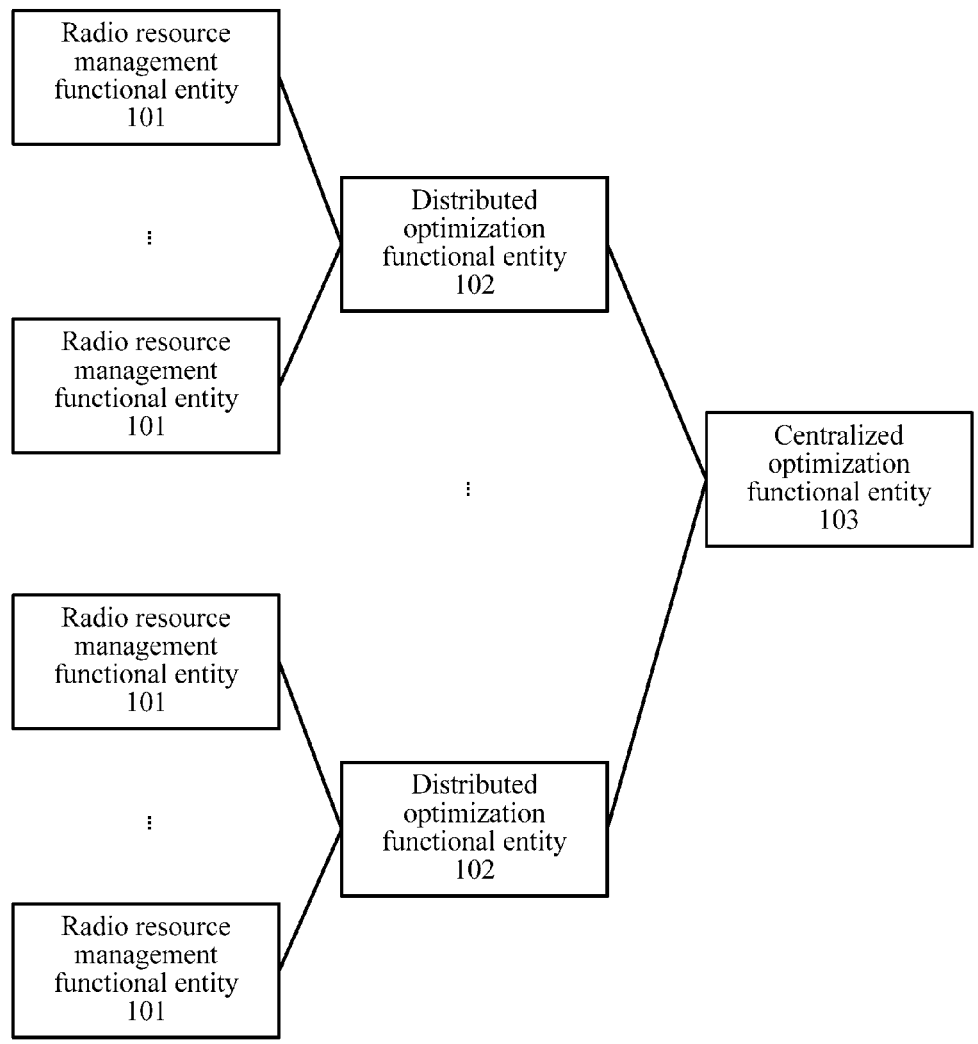
FIG. 1 is a structural block diagram of a network optimization system according to an embodiment of the present invention.

FIG. 1 is a structural block diagram of a network optimization system according to an embodiment of the present invention. As shown in FIG. 1, the network optimization system 100 includes a radio resource management entity 101, a distributed optimization functional entity 102, and a centralized optimization functional entity 103.

The radio resource management functional entity 101 is configured to determine radio resource statistical data that is based on a transmission time interval (Transmission Time Interval, TTI) time granularity, and send the radio resource statistical data to the distributed optimization functional entity 102.

The distributed optimization functional entity 102 is configured to receive the radio resource statistical data sent by the radio resource management functional entity, determine, according to the radio resource statistical data, first statistical data that is based on a first time granularity, acquire characteristic information of the radio resource management functional entity 101, determine first reference configuration information and a first KPI according to the characteristic information of the radio resource management functional entity 101, determine association statistical data that is based on the first time granularity and that is associated with a second KPI, determine, according to first time granularity data and the first reference configuration information, a first optimization plan that corresponds to the first KPI, optimize the first KPI according to the first optimization plan, and send the first time granularity data to the centralized optimization functional entity, where the first time granularity data includes the first statistical data and the management statistical data.

The centralized optimization functional entity 103 is configured to receive the first time granularity data sent by the distributed optimization functional entity, determine, according to the first time granularity data, second statistical data that is based on a second time granularity and the second KPI, determine, according to the second statistical data, a second optimization plan that corresponds to the second KPI, and optimize the second KPI according to the second optimization plan.

According to the system shown in FIG. 1, the distributed optimization functional entity 102 can determine, according to related data of the radio resource management functional entity 101, an optimization plan that is based on a first time granularity, and the centralized optimization functional entity 103 can determine, according to a first optimization plan of the distributed optimization functional entity 102 and first time granularity data, an optimization plan that is based on a second time granularity. In this way, the system 100 implements joint optimization based on two different time granularities.

It can be understood by a person skilled in the art that a radio resource management functional entity is located in a cell, different radio resource management entities have different characteristic information that is used to acquire different characteristic descriptions, such as a scheduling policy, a constraint condition, and a parameter of a scheduler. A distributed optimization functional entity is located in each cell, and each distributed optimization functional entity may correspond to one or more radio resource management functional entities. A centralized optimization functional entity is located in a centralized control node, and the centralized optimization functional entity corresponds to multiple distributed optimization functional entities.

Further, the distributed optimization functional entity 102 is further configured to send the first optimization plan to the centralized optimization functional entity 103; the centralized optimization functional entity 103 determines, according to the first optimization plan and the second statistical data, the second optimization plan that corresponds to the second KPI, and optimizes the second KPI according to the second optimization plan. In this way, the centralized optimization functional entity may further optimize a network according to statistical data and the first optimization plan that are provided by the distributed optimization functional entity.

Further, the radio resource management functional entity 101 is further configured to receive the first optimization plan sent by the distributed optimization functional entity 102 and the second optimization plan sent by the centralized optimization functional entity. The radio resource management functional entity 101 may be further configured to determine radio resource configuration information according to the first optimization plan and the second optimization plan; and manage, according to the radio resource statistical data and the radio resource configuration information, a radio resource of a cell in which the radio resource management functional entity is located. In this way, determining of the radio resource configuration information by the radio resource management functional entity is associated with the optimization plans determined by the distributed optimization functional entity and the centralized optimization functional entity, thereby further implementing joint optimization of the network.

Further, the distributed optimization functional entity 102 is further configured to receive the second optimization plan sent by the centralized optimization functional entity. The distributed optimization functional entity 102 is specifically configured to determine the first reference configuration information according to the second optimization plan and the characteristic information of the radio resource management functional entity. In this way, determining of the second optimization plan that corresponds to the second time granularity is associated with the first optimization plan that corresponds to the first time granularity, and determining of the first optimization plan is also affected by the second optimization plan. In this way, joint optimization of KPIs of different time granularities is further implemented.

Figure 2:
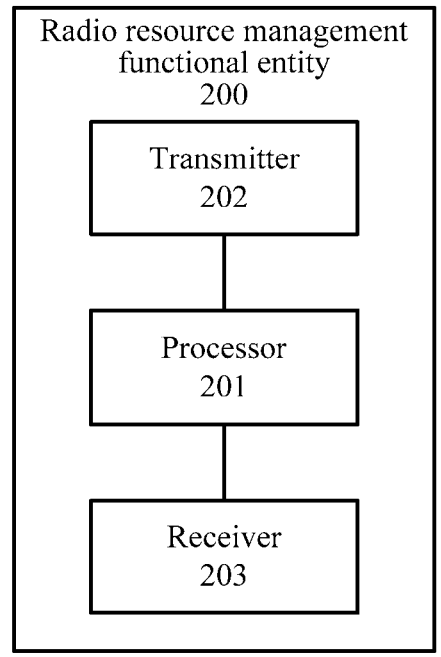
FIG. 2 is a structural block diagram of a radio resource management functional entity according to an embodiment of the present invention.

FIG. 2 is a structural block diagram of a radio resource management functional entity according to an embodiment of the present invention. The radio resource management functional entity shown in FIG. 2 is the radio resource management functional entity in the system shown in FIG. 1. As shown in FIG. 2, the radio resource management functional entity 200 includes: a processor 201, a transmitter 202, and a receiver 203.

The processor 201 is configured to determine radio resource statistical data that is based on a TTI time granularity.

Specifically, the radio resource statistical data that is based on the TTI time granularity may include network environment measurement data, resource status measurement data, and the like, such as a quantity of resource blocks (Resource Block, RB) that are already allocated currently, and rates, which can be acquired at present, of services of various types.

The transmitter 202 is configured to send the radio resource statistical data to a distributed optimization functional entity.

The receiver 203 is configured to receive a first optimization plan sent by the distributed optimization functional entity and a second optimization plan sent by a centralized optimization functional entity, where the first optimization plan is determined by the distributed optimization functional entity according to first time granularity data and first reference configuration information, the second optimization plan is determined by the centralized optimization functional entity according to second statistical data that is based on a second time granularity, and the second time granularity is greater than a first time granularity. For a specific process of determining the first optimization plan, refer to an embodiment shown in FIG. 3, and for a specific process of determining the second optimization plan, refer to an embodiment shown in FIG. 4.

The processor 201 is further configured to determine radio resource configuration information according to the first optimization plan and the second optimization plan.

The processor 201 is further configured to manage, according to the radio resource statistical data and the radio resource configuration information, a radio resource of a cell in which the radio resource management functional entity 200 is located.

Specifically, radio resource management that can be performed by the radio resource management functional entity may be user scheduling, power allocation, resource reservation, and the like.

As shown in FIG. 2, the radio resource management functional entity 200 can send radio resource statistical data to a distributed optimization functional entity, so that the distributed optimization functional entity determines, according to the radio resource statistical data, first statistical data that is based on a first time granularity, a first KPI, and association statistical data that is based on the first time granularity and that is associated with a second KPI; therefore, the distributed optimization functional entity may further determine an optimization plan that corresponds to the first KPI. In a case in which the radio resource management functional entity 200 completes initial configuration of radio resource configuration information, the radio resource management functional entity 200 can adjust the radio resource configuration information according to a first optimization plan and a second optimization plan, so that an objective of optimizing the radio resource management functional entity in combination with the first optimization plan and the second optimization plan is achieved, where an initial setting of the radio resource configuration information may be set according to a network environment or empirical data.

Figure 3:
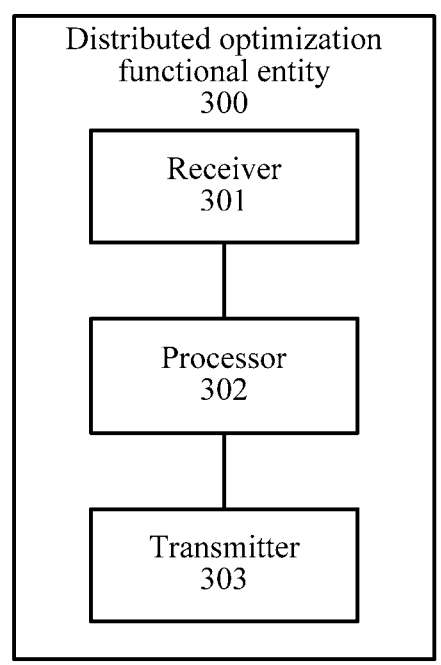
FIG. 3 is a structural block diagram of a distributed optimization functional entity according to an embodiment of the present invention.

FIG. 3 is a structural block diagram of a distributed optimization functional entity according to an embodiment of the present invention. The distributed optimization functional entity shown in FIG. 3 is the distributed optimization functional entity in the system shown in FIG. 1. As shown in FIG. 3, the distributed optimization functional entity 300 includes: a receiver 301, a processor 302, and a transmitter 303.

The receiver 301 is configured to receive radio resource statistical data sent by a radio resource management functional entity.

The processor 302 is configured to determine, according to the radio resource statistical data, first statistical data that is based on a first time granularity.

The processor 302 is further configured to acquire characteristic information of the radio resource management functional entity, and determine first reference configuration information and a first key performance index KPI according to the characteristic information of the radio resource management functional entity.

The processor 302 is further configured to determine association statistical data that is based on the first time granularity and that is associated with a second KPI.

The processor 302 is further configured to determine, according to first time granularity data and the first reference configuration information, a first optimization plan that corresponds to the first KPI, and optimize the first KPI according to the first optimization plan, where the first time granularity data includes the first statistical data and the association statistical data.

The transmitter 303 is configured to send the first time granularity data to a centralized optimization functional entity, so that the centralized optimization functional entity determines second statistical data that is based on a second time granularity, and a second optimization plan.

As shown in FIG. 3, the distributed optimization functional entity 300 can receive radio resource statistical data sent by a radio resource management functional entity, and determine, according to the radio resource statistical data, first statistical data that is based on a first time granularity, a first KPI, and association statistical data that is based on the first time granularity and that is associated with a second KPI, thereby further determining a first optimization plan that corresponds to the first KPI. Besides, the distributed optimization functional entity 300 may further send first time granularity data to a centralized optimization functional entity, so that the centralized optimization functional entity determines, according to the first time granularity data, second statistical data that is based on a second time granularity and the second KPI, and determines second reference configuration information according to the first optimization plan, so as to determine a second optimization plan and optimize the second KPI.

Further, the transmitter 302 is further configured to send the first optimization plan to the centralized optimization functional entity, so that the centralized optimization functional entity determines the second statistical data that is based on the second time granularity and the second optimization plan.

Further, the receiver 301 is further configured to receive the second optimization plan sent by the centralized optimization functional entity. In this case, the processor 302 is specifically configured to determine the first reference configuration information according to the characteristic information of the radio resource management functional entity and the second optimization plan. In this way, determining of the second optimization plan that corresponds to the second time granularity is associated with the first optimization plan that corresponds to the first time granularity, and determining of the first optimization plan is also affected by the second optimization plan. In this way, joint optimization of KPIs of different time granularities is further implemented.

Further, the transmitter 303 is further configured to send the first optimization plan to the radio resource management functional entity. In this way, the radio resource management functional entity can determine radio resource configuration information according to the first optimization plan.

Further, in a case in which the first KPI is a KPI of a small time granularity, the association statistical data that is based on the first time granularity and that is associated with the second KPI may be an average quantity of RBs in a small time granularity that are already allocated.

Further, the first statistical data may include a convergence state, a current value of a parametric variable of a distributed algorithm, and the like.

Further, different radio resource management functional entities have different characteristic information, such as a scheduling policy, a constraint condition, and a parameter of a scheduler. A distributed optimization functional entity is located in each cell, and interacts directly with a radio resource management functional entity of the cell. Therefore, the processor 302 can acquire the characteristic information of the radio resource management functional entity, and can determine an initialization configuration of the first reference configuration information that corresponds to the characteristic information of the radio resource management functional entity, so that the first optimization plan is adaptive to a characteristic of the radio resource management functional entity of the cell.

Figure 4:
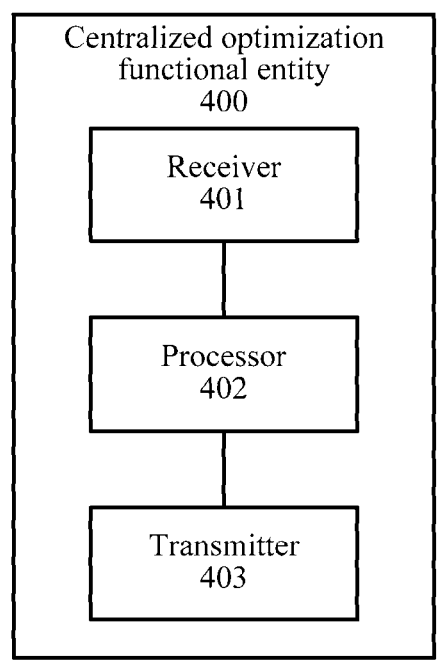
FIG. 4 is a structural block diagram of a centralized optimization functional entity according to an embodiment of the present invention.

FIG. 4 is a structural block diagram of a centralized optimization functional entity according to an embodiment of the present invention. The centralized optimization functional entity shown in FIG. 4 is the centralized optimization functional entity in the system shown in FIG. 1. As shown in FIG. 4, the centralized optimization functional entity 400 includes: a receiver 401 and a processor 402.

The receiver 401 is configured to receive first time granularity data sent by a distributed optimization functional entity, where the first time granularity data includes first statistical data and association statistical data.

The processor 402 is configured to determine, according to the first time granularity data, second statistical data that is based on a second time granularity, determine, according to the second statistical data, a second optimization plan that corresponds to a second KPI, and optimize the second KPI according to the second optimization plan.

As shown in FIG. 4, the centralized optimization functional entity 400 can determine, according to a first optimization plan of a distributed optimization functional entity and first time granularity data, an optimization plan that is based on a second time granularity. In this way, the centralized optimization functional entity 400 implements joint optimization based on two different time granularities.

Further, the receiver 401 is further configured to receive a first optimization plan sent by the distributed optimization functional entity; and the processor 402 is configured to determine, according to the second statistical data and the first optimization plan, the second optimization plan that corresponds to the second KPI, and optimize the second KPI according to the second optimization plan.

Further, the centralized optimization functional entity 400 may further include a transmitter 403, configured to send the second optimization plan to a radio resource management functional entity. In this way, the radio resource management functional entity can determine radio resource configuration information according to the second optimization plan. Alternatively, the transmitter 403 is configured to send the second optimization plan to the distributed optimization functional entity. In this way, the distributed optimization functional entity can determine first reference configuration information according to the second optimization plan. In this way, determining of the second optimization plan that corresponds to the second time granularity is associated with the first optimization plan that corresponds to a first time granularity, and determining of the first optimization plan is also affected by the second optimization plan. In this way, joint optimization of KPIs of different time granularities is further implemented. Alternatively, the transmitter 403 is configured to send the second optimization plan to the radio resource management functional entity and the distributed optimization functional entity. In this way, the second optimization plan not only can be used for determining the radio resource configuration information, but also can be used for determining the first reference configuration information.

Figure 5:
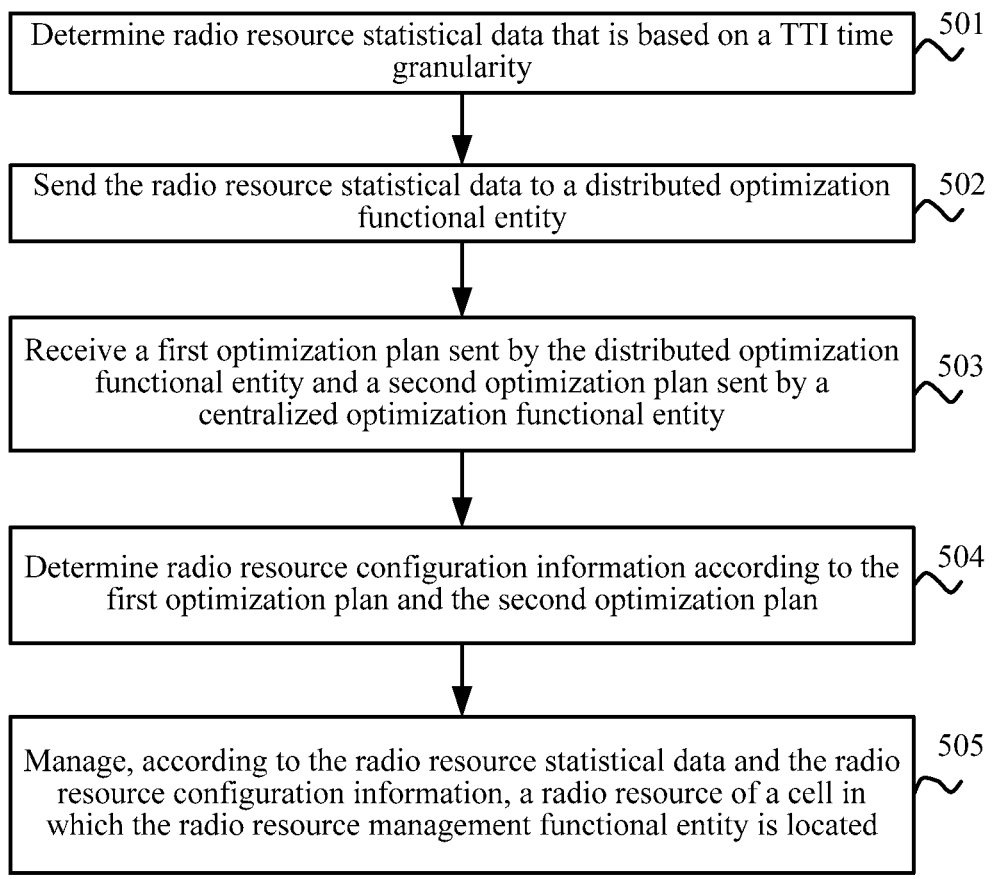
FIG. 5 is a schematic flowchart of a network optimization method according to an embodiment of the present invention.

FIG. 5 is a schematic flowchart of a network optimization method according to an embodiment of the present invention. The method shown in FIG. 5 is executed by a radio resource management functional entity.

501: Determine radio resource statistical data that is based on a TTI time granularity.

502: Send the radio resource statistical data to a distributed optimization functional entity.

503: Receive a first optimization plan sent by the distributed optimization functional entity and a second optimization plan sent by a centralized optimization functional entity, where the first optimization plan is determined by the distributed optimization functional entity according to first time granularity data and first reference configuration information, the second optimization plan is determined by the centralized optimization functional entity according to second statistical data that is based on a second time granularity, and the second time granularity is greater than a first time granularity. For a specific process of determining the first optimization plan, refer to an embodiment shown in FIG. 6, and for a specific process of determining the second optimization plan, refer to an embodiment shown in FIG. 7.

504: Determine radio resource configuration information according to the first optimization plan and the second optimization plan.

505: Manage, according to the radio resource statistical data and the radio resource configuration information, a radio resource of a cell in which the radio resource management functional entity is located.

According to the method shown in FIG. 5, a radio resource management functional entity can send radio resource statistical data to a distributed optimization functional entity, so that the distributed optimization functional entity determines, according to the radio resource statistical data, first statistical data that is based on a first time granularity, a first KPI, and association statistical data that is based on the first time granularity and that is associated with a second KPI; therefore, the distributed optimization functional entity may further determine an optimization plan that corresponds to the first KPI. In a case in which the radio resource management functional entity completes an initial configuration of radio resource configuration information, the radio resource management functional entity can adjust the radio resource configuration information according to a first optimization plan and a second optimization plan, so that an objective of optimizing the radio resource management functional entity in combination with the first optimization plan and the second optimization plan is achieved, where an initial setting of the radio resource configuration information may be set according to a network environment or empirical data.

Figure 6:
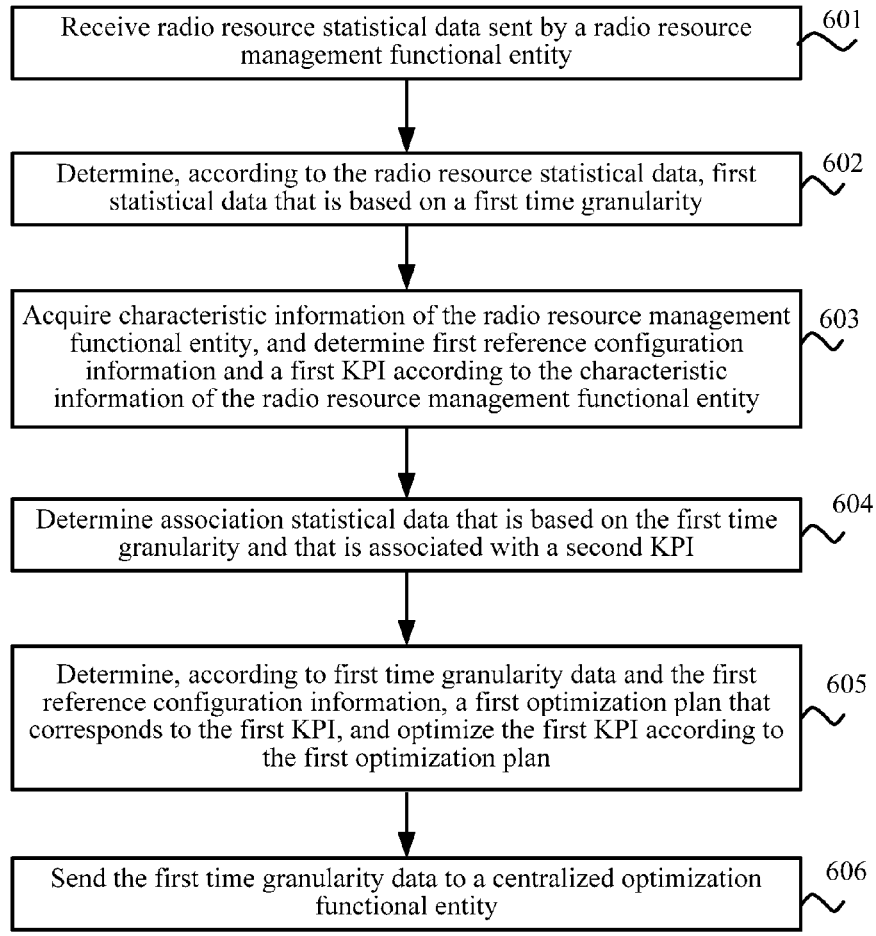
FIG. 6 is a schematic flowchart of a network optimization method according to an embodiment of the present invention.

FIG. 6 is a schematic flowchart of a network optimization method according to an embodiment of the present invention. The method shown in FIG. 6 is executed by a distributed optimization functional entity.

601: Receive radio resource statistical data sent by a radio resource management functional entity.

602: Determine, according to the radio resource statistical data, first statistical data that is based on a first time granularity.

603: Acquire characteristic information of the radio resource management functional entity, and determine first reference configuration information and a first KPI according to the characteristic information of the radio resource management functional entity.

604: Determine association statistical data that is based on the first time granularity and that is associated with a second KPI.

605: Determine, according to first time granularity data and the first reference configuration information, a first optimization plan that corresponds to the first KPI, and optimize the first KPI according to the first optimization plan, where the first time granularity data includes the first statistical data and the association statistical data.

606: Send the first time granularity data to a centralized optimization functional entity, so that the centralized optimization functional entity determines second statistical data that is based on a second time granularity and second reference configuration information, where the first time granularity data includes the first statistical data and the association statistical data.

According to the method shown in FIG. 6, a distributed optimization functional entity can receive radio resource statistical data sent by a radio resource management functional entity, and determine, according to the radio resource statistical data, first statistical data that is based on a first time granularity, a first KPI, and association statistical data that is based on the first time granularity and that is associated with a second KPI; therefore, a first optimization plan that corresponds to the first KPI may be further determined. Besides, the distributed optimization functional entity may further send first time granularity data to a centralized optimization functional entity, so that the centralized optimization functional entity determines, according to the first time granularity data, second statistical data that is based on a second time granularity, and a second KPI, and determines second reference configuration information according to the first optimization plan, so as to determine a second optimization plan and optimize the second KPI.

Further, the distributed optimization functional entity may further send the first statistical data to the centralized optimization functional entity, so that the centralized optimization functional entity determines the second statistical data that is based on the second time granularity and the second reference configuration information.

Further, before the determining first reference configuration information according to the characteristic information of the radio resource management functional entity, the method may further include: receiving the second optimization plan sent by the centralized optimization functional entity. In this case, the determining first reference configuration information according to the characteristic information of the radio resource management functional entity includes: determining the first reference configuration information according to the characteristic information of the radio resource management functional entity and the second optimization plan.

Further, the method further includes: sending the first optimization plan to the radio resource management functional entity, so that the radio resource management functional entity determines radio resource configuration information.

Figure 7:
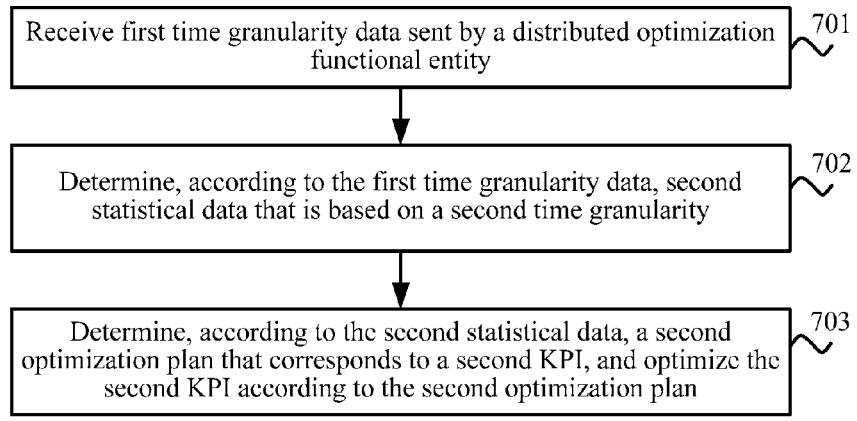
FIG. 7 is a schematic flowchart of a network optimization method according to an embodiment of the present invention.

FIG. 7 is a schematic flowchart of a network optimization method according to an embodiment of the present invention. The method shown in FIG. 7 is executed by a centralized optimization functional entity.

701: Receive first time granularity data sent by a distributed optimization functional entity, where the first time granularity data includes first statistical data and association statistical data.

702: Determine, according to the first time granularity data, second statistical data that is based on a second time granularity.

703: Determine, according to the second statistical data, a second optimization plan that corresponds to a second KPI, and optimize the second KPI according to the second optimization plan.

According to the method shown in FIG. 7, a centralized optimization functional entity can determine, according to a first optimization plan of a distributed optimization functional entity and first time granularity data, an optimization plan that is based on a second time granularity. In this way, the centralized optimization functional entity implements joint optimization based on two different time granularities.

Further, the method further includes: receiving a first optimization plan sent by the distributed optimization functional entity. In this case, the determining, according to the second statistical data, a second optimization plan that corresponds to a second KPI includes: determining, according to the second statistical data and the first optimization plan, the second optimization plan that corresponds to the second KPI.

Further, the method further includes: sending the second optimization plan to a radio resource management functional entity; or, sending the second optimization plan to a distributed optimization management functional entity; or, sending the second optimization plan to a radio resource management functional entity and a distributed optimization management functional entity.

For convenience of description, an embodiment shown in FIG. 8 describes the present invention in a manner in which three parties which are a radio resource management functional entity, a distributed optimization functional entity, and a centralized optimization functional entity interact. However, the three entities, that is, the radio resource management functional entity, the distributed optimization functional entity, and the centralized optimization functional entity, may execute their respective process steps independently when implementing the solutions of the present invention.

FIG. 8 is a schematic diagram of a network optimization method according to an embodiment of the present invention.

801: A radio resource management functional entity determines radio resource statistical data that is based on a TTI time granularity, sends the radio resource statistical data to a distributed optimization functional entity, receives a first optimization plan sent by the distributed optimization functional entity and a second optimization plan sent by a centralized optimization functional entity, determines radio resource configuration information according to the first optimization plan and the second optimization plan, and manages, according to the radio resource statistical data and the radio resource configuration information, a radio resource of a cell in which the radio resource management functional entity is located.

802: The distributed optimization functional entity receives the radio resource statistical data sent by the radio resource management functional entity, determines, according to the radio resource statistical data, first statistical data that is based on a first time granularity, acquires characteristic information of the radio resource management functional entity, determines first reference configuration information and a first KPI according to the characteristic information of the radio resource management functional entity, determines association statistical data that is based on the first time granularity and that is associated with a second KPI, determines, according to first time granularity data and the first reference configuration information, the first optimization plan that corresponds to the first KPI, and optimizes the first KPI according to the first optimization plan, where the first time granularity data includes the first statistical data and the association statistical data, and sends the first time granularity data to the centralized optimization functional entity, so that the centralized optimization functional entity determines second statistical data that is based on a second time granularity, a second KPI, and second reference configuration information, where the first time granularity data includes the first statistical data and the association statistical data.

803: The centralized optimization functional entity receives the first time granularity data sent by the distributed optimization functional entity, where the first time granularity data includes the first statistical data and the association statistical data; determines, according to the first time granularity data, the second statistical data that is based on the second time granularity, determines, according to the second statistical data, the second optimization plan that corresponds to the second KPI, and optimizes the second KPI according to the second optimization plan.

According to the method shown in FIG. 8, a distributed optimization functional entity can determine, according to related data of a radio resource management functional entity, an optimization plan that is based on a first time granularity, and a centralized optimization functional entity can determine, according to a first optimization plan of the distributed optimization functional entity and first time granularity data, an optimization plan that is based on a second time granularity. In this way, joint optimization based on two different time granularities is implemented.

Further, acquiring the radio resource configuration information includes: determining the radio resource configuration information according to the first optimization plan received from the distributed optimization functional entity and the second optimization plan received from the centralized optimization functional entity.

Further, the determining first reference configuration information includes: determining the first reference configuration information according to the second optimization plan received from the centralized optimization functional entity and the characteristic information of the radio resource management entity.

The present invention is described below with reference to specific embodiments. It should be noted that the following embodiments are merely intended for helping a person of ordinary skill in the art to better understand the embodiments of the present invention, but not for limiting the embodiments of the present invention. This embodiment is a specific embodiment of the network optimization system, device, and method according to the embodiments shown in FIG. 1 to FIG. 8. Specifically, in this embodiment of the present invention, optimization is performed for interference coordination between cells. A person of ordinary skill in the art may also perform network optimization for another optimization problem in a network according to the embodiments shown in FIG. 1 to FIG. 8.

One Embodiment

A layer 0 radio resource management functional entity is configured to determine radio resource statistical data that is based on a TTI time granularity, and send the radio resource statistical data to a distributed optimization functional entity. In this embodiment, the radio resource statistical data includes a resource block that is already allocated and a current service request quantity. Specifically, the layer 0 radio resource management functional entity is located in a cell, and is configured to complete user scheduling based on a given scheduling policy and configuration parameter. In other words, the radio resource management functional entity in this embodiment is a radio resource management functional entity that is configured to perform scheduling. At present, multiple scheduling polices are available, such as commonly seen proportional fair (Proportionally Fair Scheduling, PF) scheduling and polling scheduling. For example, the radio resource management functional entity may take into consideration both a cell throughput and user fairness, and makes a user scheduling decision according to service requests of all current users, a current channel state, and an available resource. Specifically, as an embodiment, the radio resource management functional entity may estimate, according to a channel state at a current TTI, a rate $T_{ij}$ that can be obtained by each user i on each resource block j; and then, makes a scheduling decision to schedule the user i to the resource block j, thereby maximizing $$P = \frac{T_{ij}^{\alpha}}{R_i^{\beta}},$$

where $R_i$ is an average rate (which is equivalent to the radio resource statistical data) that has been obtained by the user i, α and β are configuration parameters of the radio resource management functional entity, and the configuration parameters are used to control a balance between fairness and a throughput of the radio resource management functional entity. In other words, the layer 0 radio resource management functional entity may manage, according to the radio resource statistical data (that is, $T_{ij}$ and $R_i$) and radio resource configuration information (that is, the channel state at the current TTI, such as sub-band division and a power limit of each sub-band), a radio resource of a cell in which the radio resource management functional entity is located (that is, scheduling the user i to the resource block j). That is, by using the foregoing scheduling policy, the layer 0 radio resource management functional entity may collect statistics about resource blocks that are already allocated. In addition, the radio resource statistical data collected by the layer 0 radio resource management functional entity may further include the current service request quantity and the like.

A layer 1 distributed optimization functional entity is located in a cell, and is configured to receive the radio resource statistical data sent by the radio resource management functional entity. Specifically, in this embodiment, the radio resource statistical data sent by the radio resource management functional entity includes the current service request quantity and the resource block that is already allocated.

The layer 1 distributed optimization functional entity is configured to determine, according to the radio resource statistical data, first statistical data that is based on a first time granularity. In this embodiment, the first statistical data includes a service request quantity that is based on the first time granularity and an average quantity, based on the first time granularity, of resource blocks in each sub-band that are already allocated. Specifically, the radio resource statistical data sent by the radio resource management functional entity is based on the TTI time granularity, and the first statistical data collected by the distributed optimization functional entity is based on the first time granularity, for example, the first time granularity may be $T_1$ TTIs, where $T_1$ is greater than or equal to 1.

The layer 1 distributed optimization functional entity is further configured to acquire characteristic information of the radio resource management functional entity, and determine first reference configuration information and a first KPI according to the characteristic information of the radio resource management functional entity. Specifically, different radio resource management functional entities have different characteristic information, and the characteristic information is used to indicate usage of the radio resource management functional entities. In this embodiment, the radio resource management functional entity is configured to perform user scheduling. Therefore, the characteristic information of the radio resource management functional entity is about user scheduling. The distributed optimization functional entity may determine, according to the characteristic information, that the first reference configuration information is sub-band division information and the first KPI is a throughput.

The layer 1 distributed optimization functional entity is further configured to determine association statistical data that is based on the first time granularity and that is associated with a second KPI. The association statistical data may be obtained directly by the distributed optimization functional entity, may be determined based on the radio resource statistical data of the radio resource management functional entity, or may be obtained by interacting with another distributed optimization management functional entity in a network. Specifically, in this embodiment, the association statistical data may be interference environment measurement information. Optionally, the interference environment measurement information may be determined by the distributed functional entity according to the radio resource statistical data, may be determined by the distributed functional entity by interacting with another distributed optimization management functional entity, or may be obtained directly through measurement by the distributed functional entity.

The layer 1 distributed optimization functional entity is further configured to determine, according to first time granularity data and the first reference configuration information, a first optimization plan that corresponds to the first KPI, and optimize the first KPI according to the first optimization plan, where the first time granularity data includes the first statistical data and the association statistical data. Specifically, in this embodiment, the distributed optimization functional entity determines, according to the interference environment measurement information, the service request quantity that is based on the first time granularity, and the average quantity, based on the first time granularity, of resource blocks in each sub-band that are already allocated, and the sub-band division information, that the optimization plan that corresponds to the first KPI is a power limit of each sub-band. The power limit of each sub-band is used as a decision limitation condition of the layer 0 radio resource management functional entity. Specifically, if a user is scheduled to a resource block of a sub-band, a transmit power for the user cannot exceed the power limit of the sub-band.

The layer 1 distributed optimization functional entity is further configured to send the first time granularity data to a layer 2 centralized optimization functional entity. Specifically, in this embodiment, the distributed optimization functional entity sends the interference environment measurement information, the service request quantity that is based on the first time granularity, the average quantity, based on the first time granularity, of resource blocks in each sub-band that are already allocated, and the sub-band division information to the centralized optimization functional entity. Further, the layer 1 distributed optimization functional entity is further configured to send the first optimization plan to the layer 2 centralized optimization functional entity. Specifically, in this embodiment, the distributed optimization functional entity may send the power limit of each sub-band to the centralized optimization functional entity.

Optionally, the layer 2 centralized optimization functional entity is configured to receive the first time granularity data sent by the layer 1 distributed optimization functional entity. It should be noted that one centralized optimization functional entity may correspond to multiple distributed optimization functional entities. Therefore, the layer 2 centralized optimization functional entity may receive first time granularity data sent by multiple distributed optimization functional entities. The layer 2 centralized optimization functional entity may be configured to determine, according to the first time granularity data, second statistical data that is based on a second time granularity. The layer 2 centralized optimization functional entity may further be configured to determine the second KPI. Specifically, in this embodiment, the centralized optimization functional entity may determine that the second KPI is load. The centralized optimization functional entity may use $T_2$ TTIs as the second time granularity to determine the second statistical data, where $T_2$ is greater than $T_1$. Specifically, it may be determined that the second statistical data is a service request quantity that is based on the second time granularity and an average quantity, based on the second time granularity, of resource blocks in each sub-band that are already allocated. The centralized optimization functional entity may be configured to determine a second optimization plan according to the second statistical data that is based on the second time granularity, where the second optimization plan is used to divide a sub-band. The centralized optimization functional entity divides a sub-band according to the second optimization plan.

Further, the layer 2 centralized optimization functional entity may further be configured to receive the first optimization plan sent by the layer 1 distributed optimization functional entity. In this case, the layer 2 centralized optimization functional entity is configured to determine the second optimization plan according to the second statistical data that is based on the second time granularity and the first optimization plan, where the second optimization plan is used to divide a sub-band. The centralized optimization functional entity divides a sub-band according to the second optimization plan.

Further, after determining the second optimization plan, the layer 2 centralized optimization functional entity may further send the second optimization plan to the layer 1 distributed optimization functional entity. The layer 1 distributed optimization functional entity may further determine the first reference configuration information according to the characteristic information of the radio resource management functional entity and the second optimization plan. Specifically, the reference configuration information in this embodiment is the sub-band division information.

Further, after determining the first optimization plan, the layer 1 distributed optimization functional entity may further send the first optimization plan to the layer 0 radio resource management functional entity. After determining the second optimization plan, the layer 2 centralized optimization functional entity sends the second optimization plan to the layer 0 radio resource management functional entity. In this way, the layer 0 radio resource management functional entity may further determine the radio resource configuration information according to the first optimization plan and the second optimization plan. Specifically, the radio resource configuration information in this embodiment is the channel state at the current TTI.

In this embodiment, the layer 0 radio resource management functional entity makes a radio resource management decision according to a power limit of each sub-band that is determined by the layer 1 distributed optimization functional entity and sub-band division at layer 2, and measures radio resource statistical data that is based on a TTI time granularity. The layer 1 distributed optimization functional entity determines, according to the layer 0 radio resource statistical data, first time granularity data, and determines, according to the sub-band division of the layer 2 centralized optimization functional entity, the power limit of each sub-band, and sends first time granularity data to the layer 2 centralized optimization functional entity. The layer 2 centralized optimization functional entity determines second time granularity data according to the first time granularity data of the layer 1 distributed optimization functional entity, and determines sub-band division.

Another Embodiment

A layer 0 radio resource management functional entity is configured to determine radio resource statistical data that is based on a TTI time granularity, and send the radio resource statistical data to a distributed optimization functional entity. In this embodiment, the radio resource statistical data includes user distribution information and a current service request quantity.

A layer 1 distributed optimization functional entity is configured to receive the radio resource statistical data sent by the radio resource management functional entity. Specifically, in this embodiment, the radio resource statistical data sent by the radio resource management functional entity includes the user distribution information and the current service request quantity.

The layer 1 distributed optimization functional entity is configured to determine, according to the radio resource statistical data, first statistical data that is based on a first time granularity. In this embodiment, the first statistical data includes a service request quantity that is based on the first time granularity and user distribution information that is based on the first time granularity. Specifically, the radio resource statistical data sent by the radio resource management functional entity is based on the TTI time granularity, and the first statistical data collected by the distributed optimization functional entity is based on the first time granularity, for example, the first time granularity may be $T_1$ TTIs, where $T_1$ is greater than or equal to 1.

The layer 1 distributed optimization functional entity is further configured to acquire characteristic information of the radio resource management functional entity, and determine first reference configuration information and a first KPI according to the characteristic information of the radio resource management functional entity. Specifically, in this embodiment, the radio resource management functional entity is configured to perform user scheduling. Therefore, the characteristic information of the radio resource management functional entity is about user scheduling. The distributed optimization functional entity may determine, according to the characteristic information, that the first reference configuration information is a user association relationship and an antenna downtilt, and the first KPI is a cell-edge user throughput.

The layer 1 distributed optimization functional entity is further configured to determine association statistical data that is based on the first time granularity and that is associated with a second KPI. The association statistical data may be obtained directly by the distributed optimization functional entity, may be determined based on the radio resource statistical data of the radio resource management functional entity, or may be obtained by interacting with another distributed optimization management functional entity in a network. Specifically, in this embodiment, the association statistical data may be load statistical information.

The layer 1 distributed optimization functional entity is further configured to determine, according to first time granularity data and the first reference configuration information, a first optimization plan that corresponds to the first KPI, and optimize the first KPI according to the first optimization plan, where the first time granularity data includes the first statistical data and the association statistical data. Specifically, in this embodiment, the distributed optimization functional entity determines configuration parameters ($\alpha$ and $\beta$) of the radio resource management functional entity and a cell transmit power limit according to the antenna downtilt, the user association relationship, the load statistical information, the user distribution information that is based on the first time granularity, and the service request quantity that is based on the first time granularity, so as to optimize the first KPI, that is, the cell-edge user throughput.

A layer 2 centralized optimization functional entity is configured to receive the first time granularity data sent by the layer 1 distributed optimization functional entity. It should be noted that one centralized optimization functional entity may correspond to multiple distributed optimization functional entities. Therefore, the layer 2 centralized optimization functional entity may receive first time granularity data sent by multiple distributed optimization functional entities. In this embodiment, the first time granularity data may include the service request quantity that is based on the first time granularity, the user distribution information that is based on the first time granularity, and the load statistical information. The layer 2 centralized optimization functional entity may be configured to determine, according to the first time granularity data, second statistical data that is based on a second time granularity, where the second statistical data may be a service request quantity that is based on the second time granularity and user distribution information that is based on the second time granularity. The layer 2 centralized optimization functional entity may further be configured to determine the second KPI. Specifically, in this embodiment, the centralized optimization functional entity may determine that the second KPI is a coverage. The layer 2 centralized optimization functional entity is configured to receive the first time granularity data sent by the layer 1 distributed optimization functional entity, determine the service request quantity that is based on the second time granularity and the user distribution information that is based on the second time granularity, and determine that the second KPI is the coverage. The centralized optimization functional entity may use $T_2$ TTIs as the second time granularity to determine the second statistical data, where $T_2$ is greater than $T_1$. The centralized optimization functional entity may be configured to determine a second optimization plan according to the second statistical data that is based on the second time granularity, where the second optimization plan is used to adjust the antenna downtilt and the user association relationship, so as to achieve an objective of optimizing the coverage, where the user association relationship is a user association relationship that corresponds to the antenna downtilt.

Further, the layer 2 centralized optimization functional entity may further be configured to receive the first optimization plan sent by the layer 1 distributed optimization functional entity. In this case, the layer 2 centralized optimization functional entity is configured to determine the second optimization plan according to the second statistical data that is based on the second time granularity and the first optimization plan, where the second optimization plan is used to adjust the antenna downtilt and the user association relationship, so as to achieve the objective of optimizing the coverage.

Further, after determining the second optimization plan, the layer 2 centralized optimization functional entity may further send the second optimization plan to the layer 1 distributed optimization functional entity. The layer 1 distributed optimization functional entity may determine the first reference configuration information according to the characteristic information of the radio resource management functional entity and the second optimization plan. Specifically, the first reference configuration information in this embodiment is the antenna downtilt and the user association relationship.

Further, after determining the first optimization plan, the layer 1 distributed optimization functional entity may further send the first optimization plan to the layer 0 radio resource management functional entity. After determining the second optimization plan, the layer 2 centralized optimization functional entity sends the second optimization plan to the layer 0 radio resource management functional entity. In this way, the layer 0 radio resource management functional entity may determine the radio resource configuration information according to the first optimization plan and the second optimization plan. Specifically, the radio resource configuration information in this embodiment is a channel state at a current TTI.

In this embodiment, the layer 0 radio resource management entity makes a radio resource management decision according to a transmit power limit and configuration parameters $\alpha$ and $\beta$ that are determined by the layer 1 centralized optimization functional entity, and an antenna downtilt and a user association relationship that are determined by layer 2, and measures radio resource statistical data that is based on a TTI time granularity. The layer 1 distributed optimization functional entity determines first time granularity data according to the radio resource statistical data of layer 0, and determines the configuration parameters $\alpha$ and $\beta$ of the radio resource management functional entity and the transmit power limit according to the antenna downtilt and the corresponding user association relationship that are determined by the layer 2 centralized optimization functional entity, and sends the first time granularity data to the layer 2 centralized optimization functional entity. The layer 2 centralized optimization functional entity determines second time statistical data according to the first time granularity data of the layer 1 distributed optimization functional entity, and determines the cell antenna downtilt and the corresponding user association relationship.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium and includes several instructions for instructing a computer device (which may be a personal computer, a server, or a network device) or a processor (processor) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A radio resource management functional entity, wherein the radio resource management functional entity comprises:
    a processor, configured to determine radio resource statistical data that is based on a transmission time interval (TTI) time granularity;
    a transmitter, configured to send the radio resource statistical data to a distributed optimization functional entity; and
    a receiver, configured to receive a first optimization plan sent by the distributed optimization functional entity and a second optimization plan sent by a centralized optimization functional entity, wherein the first optimization plan is determined by the distributed optimization functional entity according to first time granularity data and first reference configuration information, the second optimization plan is determined by the centralized optimization functional entity according to second statistical data that is based on a second time granularity, and the second time granularity is greater than a first time granularity, wherein
    the processor is further configured to determine radio resource configuration information according to the first optimization plan and the second optimization plan; and
    the processor is further configured to manage, according to the radio resource statistical data and the radio resource configuration information, a radio resource of a cell in which the radio resource management functional entity is located.

2. A network optimization method, wherein the method is executed by a radio resource management functional entity, and the method comprises:
    determining radio resource statistical data that is based on a transmission time interval (TTI) time granularity;
    sending the radio resource statistical data to a distributed optimization functional entity;
    receiving a first optimization plan sent by the distributed optimization functional entity and a second optimization plan sent by a centralized optimization functional entity, wherein the first optimization plan is determined by the distributed optimization functional entity according to first time granularity data and first reference configuration information, the second optimization plan is determined by the centralized optimization functional entity according to second statistical data that is based on a second time granularity, and the second time granularity is greater than a first time granularity;
    determining radio resource configuration information according to the first optimization plan and the second optimization plan; and
    managing, according to the radio resource statistical data and the radio resource configuration information, a radio resource of a cell in which the radio resource management functional entity is located.

* * * * *